(12) United States Patent
Huang

(10) Patent No.: US 11,063,515 B2
(45) Date of Patent: *Jul. 13, 2021

(54) POWER CONVERTER

(71) Applicant: Nuvoton Technology Corporation, Hsinchu (TW)

(72) Inventor: Po-Hsun Huang, Tainan (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,921

(22) Filed: Oct. 8, 2019

(65) Prior Publication Data

US 2020/0177081 A1 Jun. 4, 2020

(30) Foreign Application Priority Data

Dec. 4, 2018 (TW) .................................. 107143362

(51) Int. Cl.
*H02M 3/158* (2006.01)
*H02M 3/07* (2006.01)
*H02M 1/00* (2006.01)

(52) U.S. Cl.
CPC ............ *H02M 3/158* (2013.01); *H02M 1/00* (2013.01); *H02M 3/07* (2013.01); *H02M 2001/0041* (2013.01)

(58) Field of Classification Search
CPC ................................ H02M 3/155; H02M 3/07
See application file for complete search history.

(56) References Cited

U.S. PATENT DOCUMENTS

| 8,723,491 B2 * | 5/2014 | Giuliano | ................. | H02M 3/07 |
| | | | | 323/266 |
| 2009/0278520 A1 * | 11/2009 | Perreault | ................. | H02M 3/07 |
| | | | | 323/282 |
| 2020/0204071 A1 * | 6/2020 | Huang | ................. | H02M 3/158 |

* cited by examiner

*Primary Examiner* — Peter M Novak
(74) *Attorney, Agent, or Firm* — Muncy, Geissler, Olds & Lowe, P.C.

(57) ABSTRACT

A power converter is provided. The power converter includes a switched-capacitor conversion circuit and an inductor buck circuit. The switched-capacitor conversion circuit receives an input voltage and operates according to a first operation frequency to convert the input voltage to an intermediate voltage. The inductor buck circuit is coupled to the switched-capacitor conversion circuit in series. The inductor buck circuit receives the intermediate voltage and operates on a second operation frequency to generate an output voltage at a conversion output terminal according to the intermediate voltage. The first operation frequency is determined according to the second operation frequency.

8 Claims, 5 Drawing Sheets

POWER CONVERTER

CROSS-REFERENCE TO RELATED APPLICATION

This application claims the benefit of Taiwan Patent Application No. 107143362, filed on Dec. 4, 2018, in the Taiwan Intellectual Property Office, the disclosure of which is incorporated herein in its entirety by reference.

BACKGROUND OF THE INVENTION

1. Field of the Invention

The present invention relates to a power converter, more particularly to a mixed power converter.

2. Description of the Related Art

When a conventional buck converter is operated with a higher voltage conversion rate, a higher voltage stress is applied between an input terminal and an output terminal of the conventional buck converter, so it is difficult to implement the conventional buck converter having higher efficiency. For this reason, a mixed switched capacitor converter was developed. The mixed switched capacitor converter includes a first stage formed by a switched capacitor converter and a second stage formed by a buck converter. Compared with the conventional buck converter, the mixed switched capacitor converter has a higher efficiency with a higher voltage drop. However, each of the switched capacitor converter and the buck converter needs a dedicated oscillator to generate a basic clock signal for operation, and the extra oscillator increases the size of the mixed switched capacitor converter. Furthermore, when the switched capacitor converter is switched during a period in which inductor current of the buck converter decrease, the switched capacitor converter causes a high transient current spike, and it impacts efficiency of the switched capacitor converter.

SUMMARY OF THE INVENTION

An objective of the present invention is to provide a mixed power converter which decreases the size and improves the efficiency of the mixed power converter by controlling a timing of a switching operation of a switched-capacitor conversion circuit in a first stage thereof without dedicated clock generator.

In order to achieve the objective, the present invention provides a power converter comprising a switched-capacitor conversion circuit and an inductor buck circuit. The switched-capacitor conversion circuit can receive an input voltage, and operate, according to a first operating frequency, to convert the input voltage into an intermediate voltage. The inductor buck circuit is connected in series to the switched-capacitor conversion circuit, and can receive the intermediate voltage and operated with a second operating frequency to generate an output voltage on a conversion output terminal according to the intermediate voltage. The first operating frequency is determined by the second operating frequency.

According to an embodiment, the switched-capacitor conversion circuit comprises a plurality of switches, and the inductor buck circuit comprises a high-side switch and an inductor connected in series between the switched-capacitor conversion circuit and the conversion output terminal. During a period in which the high-side switch is turned on, the plurality of switches of the switched-capacitor conversion circuit are switched according to the first operating frequency.

According to an embodiment, the switched-capacitor conversion circuit is configured to operate according to a clock signal having the first operating frequency, and the inductor buck circuit comprises a high-side switch and an inductor connected in series between the switched-capacitor conversion circuit and the conversion output terminal, and the high-side switch is controlled by a first switching signal having a second operating frequency. The power converter comprises a clock generator configured to receive the first switching signal, and generate the clock signal according to the first switching signal.

According to an embodiment, the clock generator comprises a frequency detection circuit configured to receive the first switching signal, detect a frequency of the first switching signal, to generate a frequency signal; and a phase detection circuit configured to receive the first switching signal and the frequency signal, and generate a detection signal, wherein when the first switching signal and the frequency signal are in phase, the phase detection circuit enables the enable signal; a frequency divider circuit configured to receive the detection signal, and generate the clock signal according to the detection signal.

According to an embodiment, the first operating frequency of the clock signal is a half of a frequency of the detection signal.

According to an embodiment, the frequency detection circuit comprises: a current source configured to provide a charging current; a first switch coupled between the current source and a first node, and controlled by the first operating signal; a capacitor coupled between the first node and a second node, wherein a ramp voltage is generated on the first node, and the frequency detection circuit receives the output voltage through the second node; a second switch coupled between the first node and the second node; and a comparator having a positive input coupled to the first node, and a negative input receiving the intermediate voltage, and configured to compare the ramp voltage and the intermediate voltage, to generate the frequency signal.

According to an embodiment, the phase detection circuit comprises a D-Flip-Flop having an input terminal receiving the detection signal, a clock terminal receiving the first switching signal, and an output terminal generating the detection signal.

According to an embodiment, the frequency divider circuit comprises a D-Flip-Flop having an input terminal, a clock terminal receiving the detection signal, an output terminal generating the clock signal, and an inverting output terminal.

According to an embodiment, the switched-capacitor conversion circuit comprises a plurality of first switches and a plurality of second switches, the plurality of first switches and the plurality of second switches are switched with the first operating frequency, and a turn-on period of the plurality of first switches and a turn-on period of the plurality of second switches do not overlap with each other.

According to an embodiment, the input terminal of the inductor buck circuit receives the intermediate voltage, and the inductor buck circuit comprises an input capacitor, a high-side switch, a low-side switch, an inductor, and output capacitor. The input capacitor is coupled between an input terminal of the inductor buck circuit and ground. The high-side switch is coupled between the input terminal of the inductor buck circuit and a first node. The low-side switch is coupled between the first node and ground. The inductor is coupled between the first node and the conversion output terminal. The output capacitor is coupled between the conversion output terminal and ground. A turn-on period of the high-side switch and a turn-on period of the low-side switch do not overlap with each other.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
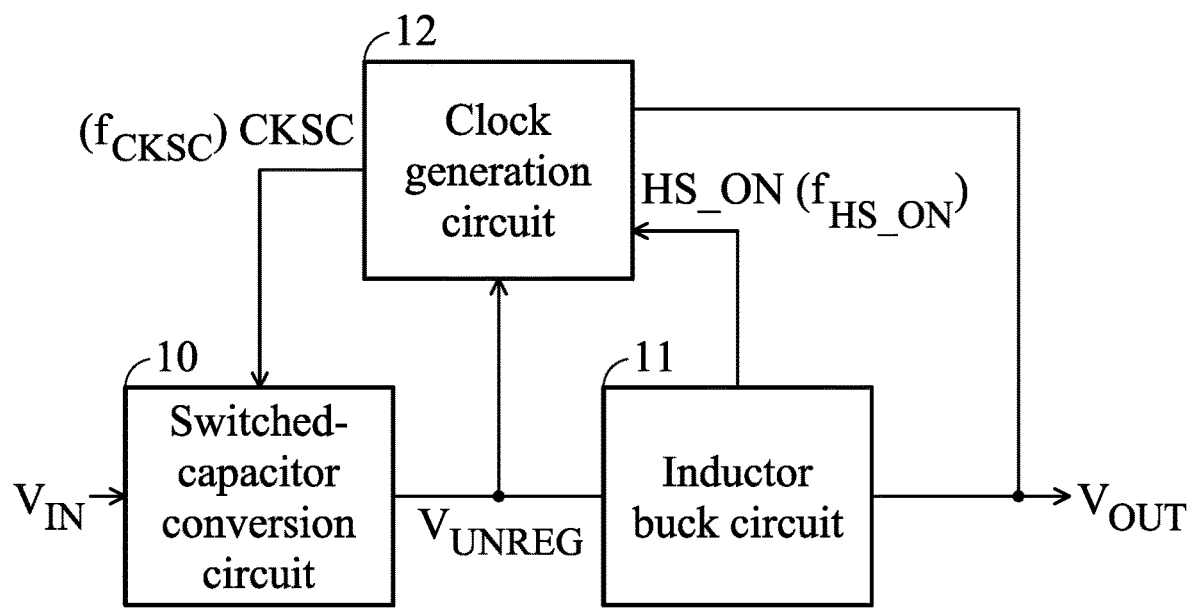
FIG. 1 is a block diagram of a power converter according to an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIG. 1, which is a block diagram of a power converter according to an embodiment of the present invention. As shown in FIG. 1, a power converter 1 is a mixed power converter which includes a first stage having a switched-capacitor conversion circuit 10, a second stage having an inductor buck circuit 11, and a clock generation circuit 12. The switched-capacitor conversion circuit 10 can receive an input voltage $V_{IN}$, and a clock signal CKSC. The switched-capacitor conversion circuit 10 uses a frequency $f_{CKSC}$ of the clock signal CKSC as an operating frequency thereof, so that the switched-capacitor conversion circuit 10 is operated with the frequency $f_{CKSC}$ of the clock signal CKSC, to convert the input voltage $V_{IN}$ into an intermediate voltage $V_{UNREG}$. The inductor buck circuit 11 is connected to the switched-capacitor conversion circuit 10 in series, to receive the intermediate voltage $V_{UNREG}$. An internal circuit of the inductor buck circuit 11 generates at least one switching signal HS_ON according to a degree of a load, and the inductor buck circuit 11 is operated with a frequency $f_{HS\_ON}$ of the switching signal HS_ON, so as to convert the intermediate voltage $V_{UNREG}$ into an output voltage $V_{OUT}$. In this embodiment, the clock generation circuit 12 receives the switching signal HS_ON of the inductor buck circuit 11, and detects the frequency $f_{HS\_ON}$ of the switching signal HS_ON, and then generates the clock signal CKSC according to the detected frequency $f_{HS\_ON}$. The operating frequency ($f_{CKSC}$) of the switched-capacitor conversion circuit 10 is determined upon the operating frequency $f_{HS\_ON}$ of the inductor buck circuit 11. The circuit architecture and operations of the switched-capacitor conversion circuit 10, the inductor buck circuit 11, and the clock generation circuit 12 are illustrated in detail in following paragraphs.

Figure 2:
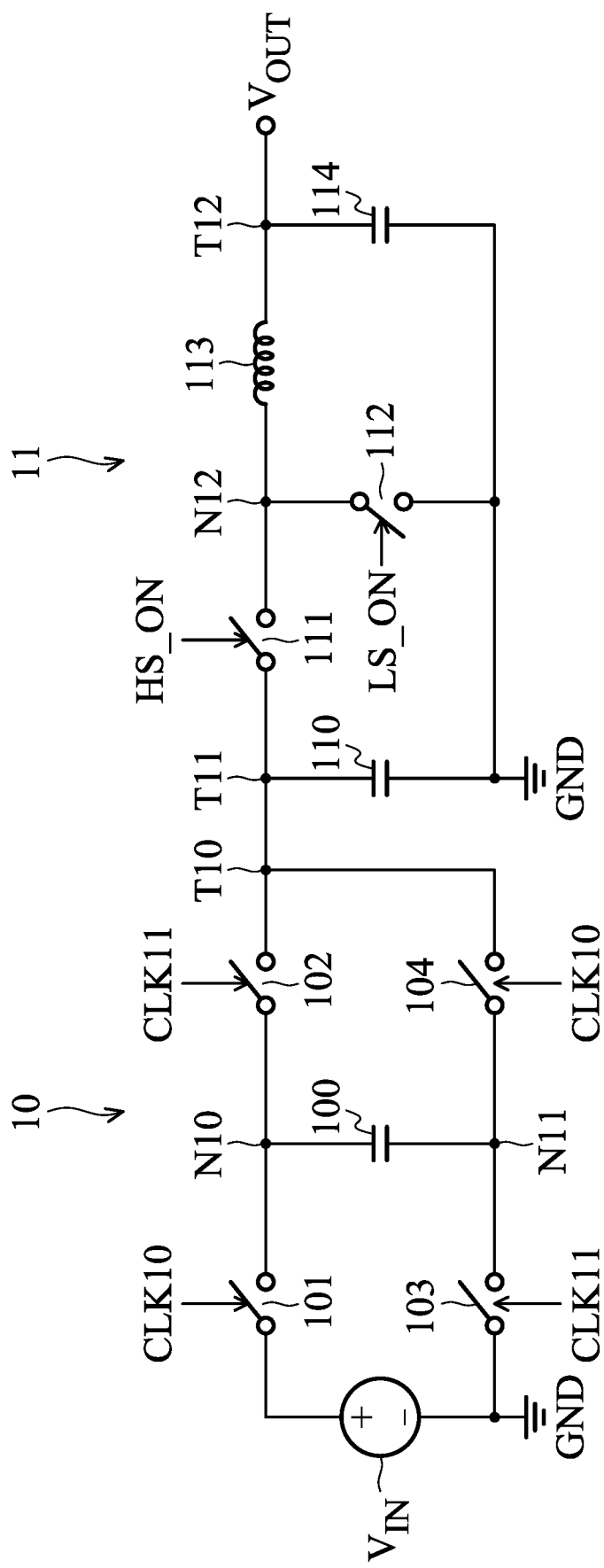
FIG. 2 is a circuit diagram of a switched-capacitor conversion circuit and an inductor buck circuit according to an embodiment of the present invention.

FIG. 2 is a circuit diagram of the switched-capacitor conversion circuit 10 and the inductor buck circuit 11 according to an embodiment of the present invention. Please refer to FIG. 2, the inductor buck circuit 11 is connected to an output terminal T10 of the switched-capacitor conversion circuit 10 in series. The switched-capacitor conversion circuit 10 comprises two switch sets. The switched-capacitor conversion circuit 10 is operated with the operating frequency ($f_{CKSC}$), and controls the two switch sets according to two different switching signals, so that the two switch sets can be turned on alternatively to convert the input voltage $V_{IN}$ into the intermediate voltage $V_{UNREG}$. The circuit architecture and operation of the switched-capacitor conversion circuit 10 are illustrated by an example in the following paragraphs. Please refer to FIG. 2. For example, the switched-capacitor conversion circuit 10 can comprise a capacitor 100 and switches 101 to 104. The switch 101 is coupled between the input voltage $V_{IN}$ and a node N10, the switch 102 is coupled between the node N10 and an output terminal T10, the switch 103 is coupled between ground GND and a node N11, and the switch 104 is coupled between the node N11 and the output terminal T10. The capacitor 100 is coupled between the node N10 and N11. The switches 101 and 104 of the first switch set are controlled by a switching signal CLK10, to switch between turn on and off states. The switches 102 and 103 of the second switch set are controlled by a switching signal CLK11, to switch between the turn on and off states. In this embodiment, the switching signals CLK10 and CLK11 are generated by the internal circuit of the switched-capacitor conversion circuit 10 based on the clock signal CKSC. Based on timing of the switching signals CLK10 and CLK11, turn-on periods of the switches 101 and 104 and turn-on period of the switches 102 and 103 do not overlap with each other. In an embodiment, the switching signals CLK10 and CLK11 have the same frequencies, but phases of the switching signals CLK10 and CLK11 are reverse to each other. As a result, the switches 101 and 104 can be turned on at the same time, and the switches 102 and 103 are turned on at the same time, but the switches 101 and 104 are not turned on during the period in which the switch 102 and 103 are turned on. In an embodiment, the frequency of the switching signals CLK10 and CLK11 is equal to the operating frequency ($f_{CKSC}$) of the switched-capacitor conversion circuit 10, that is, the switching frequency of the switches 101 to 104 is equal to the operating frequency ($f_{CKSC}$) of the switched-capacitor conversion circuit 10. In this example, the internal circuit directly, which generates the switching signals CLK10 and CLK11, of the switched-capacitor conversion circuit 10 can output the clock signal CKSC as one of the switching signals CLK10 and CLK11, and the clock signal CKSC can be inverted and then the inverted clock signal CKSC is outputted as the other of the switching signals CLK10 and CLK11. In other implementations, the frequency of the switching signals CLK10 and CLK11 is equal to 1/N of the operating frequency ($f_{CKSC}$) of the clock signal CKSC, and N is a positive integer. With the switching operations of the switches 101 to 104, the switched-capacitor conversion circuit 10 can convert the input voltage $V_{IN}$ into the intermediate voltage $V_{UNREG}$ on the output terminal T10.

Please refer to FIG. 2, the input terminal T11 of the inductor buck circuit 11 is connected to the output terminal T10 of the switched-capacitor conversion circuit 10, so that the inductor buck circuit 11 and the switched-capacitor conversion circuit 10 are connected in series. The inductor buck circuit 11 includes an input capacitor 110, a high-side switch 111, a low-side switch 112, an inductor 113, and an output capacitor 114. The input capacitor 110 is coupled between the input terminal T11 and ground GND, and can be charged by the intermediate voltage $V_{UNREG}$. The high-side switch 111 is coupled between the input terminal T11 and the node N12. The low-side switch 112 is coupled between the node N12 and the ground GND. The inductor 113 is coupled between the node N12 and the conversion output terminal T12. The output capacitor 114 is coupled between the conversion output terminal T12 and the ground GND. The high-side switch 111 is controlled by the switching signal HS_ON, to switch between the turn-on state and turn-off state. In detail, when an enable pulse occurs on the switching signal HS_ON, that is, the switching signal HS_ON is at high level, the high-side switch 111 is turned on. The low-side switch 112 is controlled by the switching signal LS_ON, to switch between the turn on state and the turn off state. In this embodiment, the switching signals HS_ON and LS_ON are generated by the internal circuit of the inductor buck circuit 11. The turn-on period of the high-side switch 111 and the turn-on period of the low-side switch 112 do not overlap with each other. In an embodiment, the switching signals HS_ON and LS_ON have the same frequencies, but the phases of the switching signals HS_ON and LS_ON are reverse to each other. The high-side switch 111 and the low-side switch 112 are not turned on at the same time. With the switching operations of the high-side switch 111 and the low-side switch 112, the inductor buck circuit 11 can generate the output voltage $V_{OUT}$ at the conversion output terminal T12, according to the intermediate voltage $V_{UNREG}$.

According to the turn on/off states of the high-side switch 111 and the low-side switch 112, the inductor buck circuit 11 can be operated in two modes, to generate the output voltage $V_{OUT}$. Please refer to FIG. 3A. When the high-side switch 111 is turned on according to the switching signal HS_ON and the low-side switch 112 is turned off according to the switching signal LS_ON, the inductor buck circuit 11 enters a soft-charging mode. In the soft-charging mode, the current $I_{HS}$, which is drawn from the input capacitor 110 and flows through the input terminal T11, the high-side switch 111 and the inductor 113, is generated. Please refer to FIG. 3B. When the high-side switch 111 is turned off according to the switching signal HS_ON and the low-side switch 112 is turned on according to the switching signal LS_ON, the inductor buck circuit 11 enters a hard-charging mode. In the hard-charging mode, a current $I_{LS}$ flowing through the low-side switch 112 and the inductor 113 is generated.

Figure 3A:
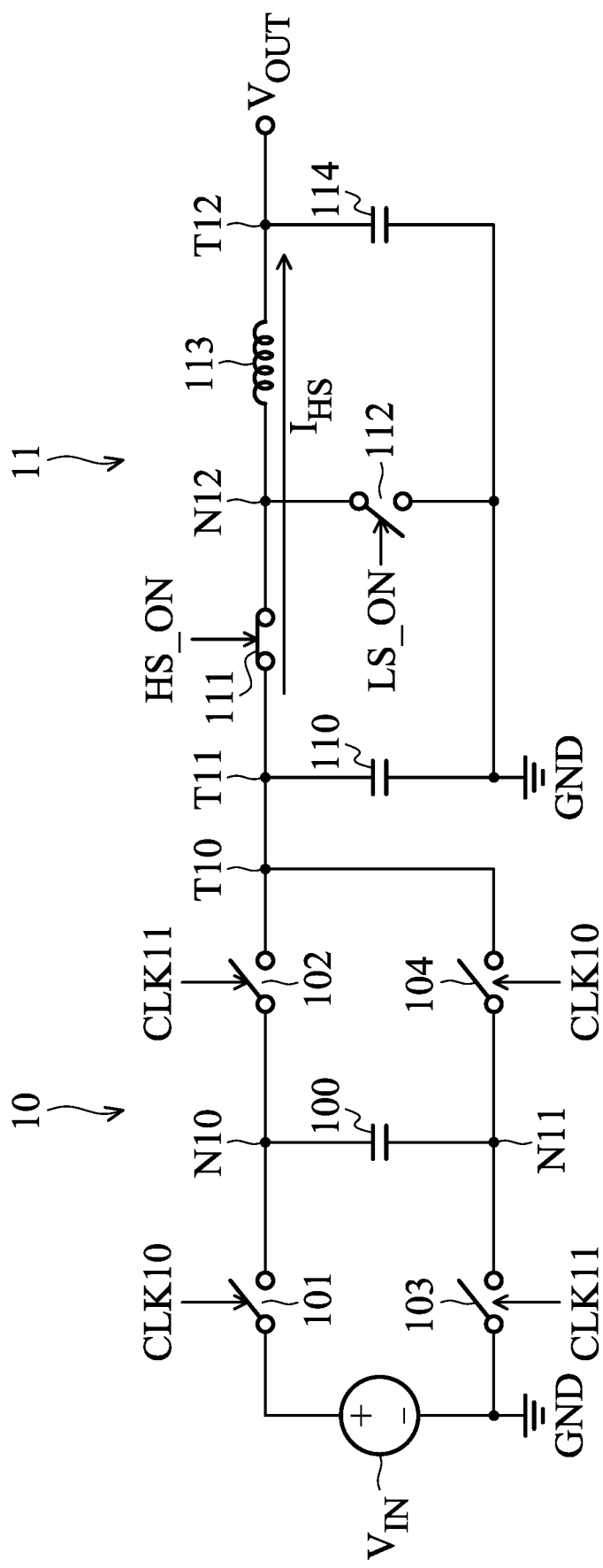
FIG. 3A is a schematic view of an inductor buck circuit being operated in a soft-charging mode according to an embodiment of the present invention.
Figure 3B:
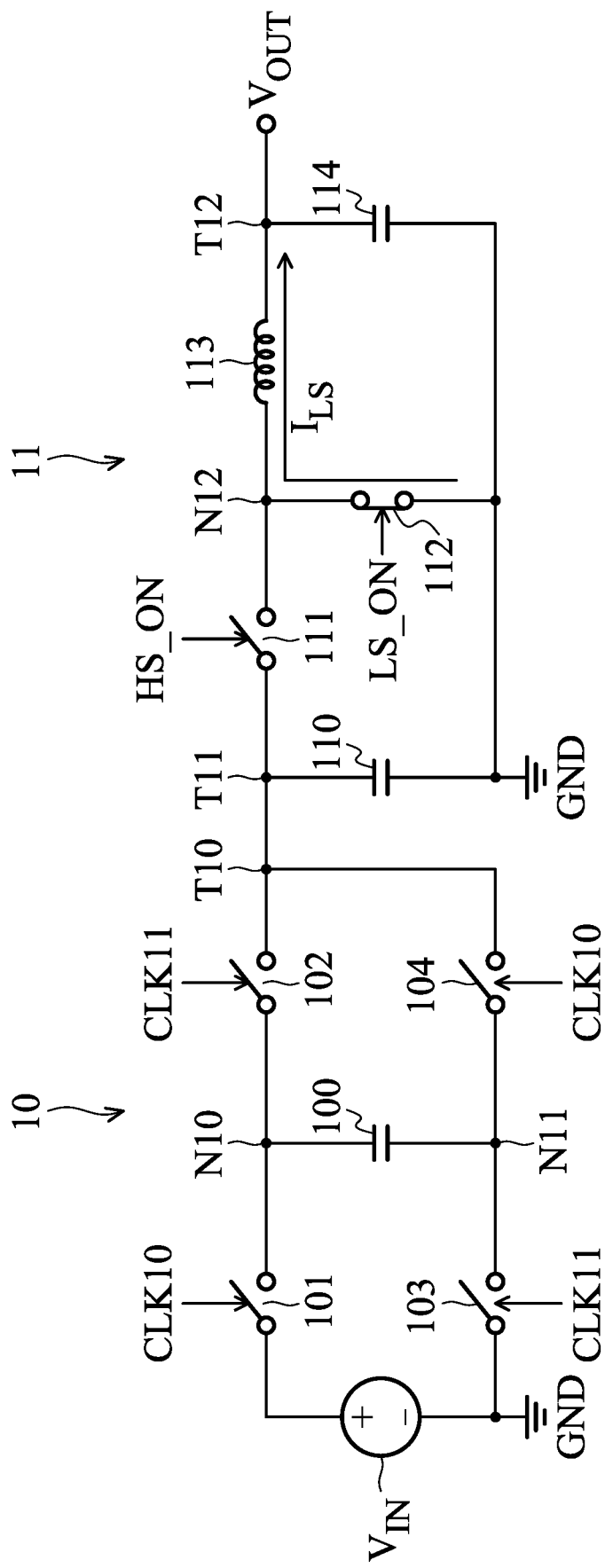
FIG. 3B is a schematic view of, an inductor buck circuit being operated in a hard-charging mode according to an embodiment of the present invention.

The switches 101 to 104 of the switched-capacitor conversion circuit are switched between the turn-on state and turn off state. When the switches 101 to 104 are switched, a transient current spike occurs on the current flowing through the capacitor 100, and it reduces efficiency of the switched-capacitor conversion circuit. In order to eliminate the transient current spike, a constant current load can be connected to the capacitor 100 in series. As shown in FIG. 3A, in the soft-charging mode, the high-side switch 111 is turned on, and the inductor 113 and the capacitor 100 are connected in series. Since the inductance current must be continuous, the inductor 113 can be regarded as the constant current load connected to the capacitor 100 in series in the soft-charging mode. Therefore, the switched 101 to 104 can be switched during the period in which the high-side switch 111 is turned on, without generating the transient current spike.

Figure 4:
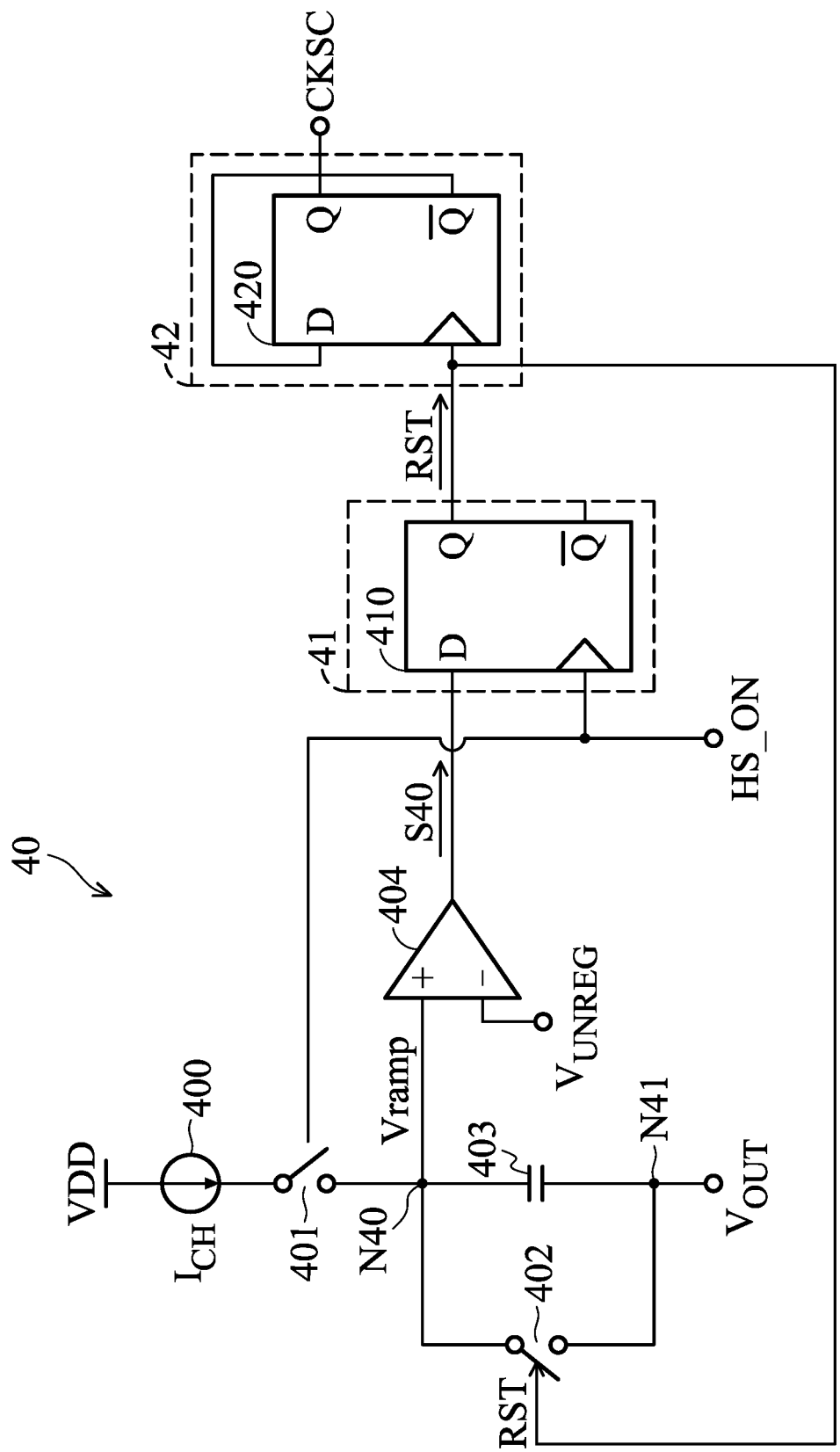
FIG. 4 is a block diagram of a clock generation circuit according to one embodiment of the present invention.

The switching operation of the high-side switch 111 is controlled by the switching signal HS_ON. For this reason, the clock generation circuit 12 of the present disclosure generates the clock signal CKSC according to the switching signal HS_ON, to switch the control switches 101 to 104; that is, the frequency ($f_{CKSC}$) of the clock signal CKSC is determined by the frequency ($f_{HS\_ON}$) of the switching signal HS_ON, so that the switches 101 to 104 are switched during the period in which the high-side switch 111 is turned on. Please refer to FIG. 4, which shows a clock generation circuit 12 according to one embodiment of the present invention. As shown in FIG. 4, the clock generation circuit 12 receives the intermediate signal $V_{UNREG}$, the switching signal HS_ON and the output voltage $V_{OUT}$, and includes a frequency detection circuit 40, a phase detection circuit 41 and a frequency divider circuit 42. The frequency detection circuit 40 includes a current source 400, switches 401 and 402, a capacitor 403 and a comparator 404. The current source 400 is coupled to an operating voltage VDD of the power converter 1, and provides a charging current $I_{CH}$. The switch 401 is coupled between the current source 400 and a node N40 and controlled by the switching signal HS_ON. The capacitor 403 is coupled between the node N40 and a node N41. The frequency detection circuit 40 receives the output voltage $V_{OUT}$ through the node N41. The switch 402 is coupled between the node N40 and the node N41. The comparator 404 has a positive input coupled to the node N40, and a negative input for receiving the intermediate voltage $V_{UNREG}$. The comparator 404 performs a comparison operation, and generates a frequency signal S40 on an output terminal thereof according to a comparison result. The phase detection circuit 41 includes a D-Flip-Flop 410.

The D-Flip-Flop 410 has an input terminal D for receiving the frequency signal S40, a clock terminal CK for receiving the switching signal HS_ON, and an output terminal Q for generating a detection signal RST. In this embodiment, the frequency divider 42 is implemented by a ½ frequency divider. The frequency divider 42 can include a D-Flip-Flop 420. The D-Flip-Flop 420 has an input terminal D connected to an inverting output terminal $\overline{Q}$ thereof, a clock terminal CK for receiving the detection signal RST, an output terminal Q for generating the clock signal CKSC. The clock signal CKSC is inverse to the signal of the inverting output terminal $\overline{Q}$.

As shown in FIG. 4, the switch 401 is controlled by the switching signal HS_ON. In detail, when an enable pulse (high level) is applied to the switching signal HS_ON, the switch 401 is turned on and the capacitor 403 is charged by the charging current ICH of the current source 400. For this reason, the ramp voltage Vramp on the node N40 is gradually risen because of the output voltage VOUT. When the switch 402 is turned on, the capacitor 403 is discharged and the ramp voltage Vramp is reset to be a voltage level of the output voltage $V_{OUT}$. The comparator 404 compares the ramp voltage Vramp with the intermediate voltage $V_{UNREG}$. When the ramp voltage Vramp is lower than the intermediate voltage $V_{UNREG}$, the frequency signal S40 is set to be a low level. When the ramp voltage Vramp is higher than the intermediate voltage $V_{UNREG}$, the frequency signal S40 is changed to be the high level. According to the charging operation of the capacitor 403, when the frequency of the switching signal HS_ON is higher, the ramp voltage Vramp can be risen faster, so that the frequency signal S40 can be changed to the high level from the low level. For this reason, the frequency of the frequency signal S40 is associated with the frequency of the switching signal HS_ON, and particularly, the frequency of the frequency signal S40 is proportional to the frequency of the switching signal HS_ON. According to aforementioned content, the frequency detection circuit 40 can be operated to detect the frequency of the switching signal HS_ON, so as to generate the frequency signal S40 indicative of the frequency of the switching signal HS_ON.

With the operation of the D-Flip-Flop 410, when the switching signal HS_ON is at the high level, the voltage level of the detection signal RST varies along with the frequency signal S40. In detail, when the switching signal HS_ON is at the high level and the frequency signal S40 is at the low level, the detection signal RST is at the low level, that is, the D-Flip-Flop 410 reversely enables the detection signal RST. When the switching signal HS_ON and the frequency signal S40 are detect to be the high level and the switching signal HS_ON and the frequency signal S40 are in phase, the detection signal RST is changed to the high level, that is, the D-Flip-Flop 410 enables the detection signal RST. For this reason, the phase detection circuit 41 can use the D-Flip-Flop 410 to detect a phase relationship between the switching signal HS_ON and the frequency signal S40, and then generate the detection signal RST to indicate the detected phase relationship. Furthermore, when the detection signal RST is at the high level, the switch 402 is turned on to reset the ramp voltage Vramp as the voltage level of the output voltage $V_{OUT}$. With the operation of the D-Flip-Flop 420, the frequency of the generated clock signal CKSC can be equal to a half of the frequency of the detection signal RST.

According to aforementioned content, the change in the voltage level of the detection signal RST occurs when the switching signal HS_ON is at the high level. Therefore, the change in the voltage level of the clock signal CKSC, which is generated according to the detection signal RST, also occurs when the switching signal HS_ON is at the high level. Since the frequencies of the switching signals CLK10 and CLK11 are equal to the frequency ($f_{CKSC}$) of the clock signal CKSC, the change in the voltage levels of the switching signals CLK10 and CLK11 also occurs when the switching signal HS_ON is at the high level. By controlling the switching signal HS_ON and the switching signals CLK10 and CLK11, the switches 101 to 104 can be switched during the period in which the high-side switch 111 is turned on, so as to eliminate the transient current spike.

According to an embodiment of the present invention, the power converter 1 does not need an oscillator dedicated for the switched-capacitor conversion circuit 10. The power converter 1 can control the clock signal CKSC of the switched-capacitor conversion circuit 10 according to the switching signal HS_ON which is also used by the inductor buck circuit 11. Furthermore, by controlling the clock signal CKSC, the switches 101 to 104 of the switched-capacitor conversion circuit 10 can be switched when the inductor buck circuit 11 is operated in the soft-charging mode, so as to prevent occurrence of the transient current spike, thereby improving efficiency of the switched-capacitor conversion circuit 10.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A power converter, comprising:
   a switched-capacitor conversion circuit configure to receive an input voltage, and operate, according to a first operating frequency, to convert the input voltage into an intermediate voltage; and
   an inductor buck circuit connected in series to the switched-capacitor conversion circuit, and configured to receive the intermediate voltage and operated with a second operating frequency to generate an output voltage on a conversion output terminal according to the intermediate voltage,
   wherein the switched-capacitor conversion circuit comprises a plurality of switches, and the inductor buck circuit comprises a high-side switch and an inductor connected in series between the switched-capacitor conversion circuit and the conversion output terminal,
   wherein during a period in which the high-side switch is turned on, all of the plurality of switches of the switched-capacitor conversion circuit are switched according to the first operating frequency; and
   wherein all of the plurality of switches are used in power conversion of the switched-capacitor conversion circuit.

2. The power converter according to claim 1, wherein the plurality of switches are switched according to a clock signal having the first operating frequency, and the high-side switch of the inductor buck circuit is controlled by a first switching signal having the second operating frequency, and
   wherein the power converter comprises a clock generator configured to receive the first switching signal, and generate the clock signal according to the first switching signal.

3. The power converter according to claim 2, wherein the clock generator comprises:

a frequency detection circuit configured to receive the first switching signal, and detect a frequency of the first switching signal, to generate a frequency signal;

a phase detection circuit configured to receive the first switching signal and the frequency signal, and generate a detection signal, wherein when the first switching signal and the frequency signal are in phase, the phase detection circuit enables the enable signal; and a frequency divider circuit configured to receive the detection signal, and generate the clock signal according to the detection signal.

4. The power converter according to claim 3, wherein the first operating frequency of the clock signal is a half of a frequency of the detection signal.

5. The power converter according to claim 3, wherein the frequency detection circuit comprises:

a current source configured to provide a charging current;

a first switch coupled between the current source and a first node, and controlled by the first operating signal;

a capacitor coupled between the first node and a second node, wherein a ramp voltage is generated on the first node, and the frequency detection circuit receives the output voltage through the second node;

a second switch coupled between the first node and the second node; and a comparator having a positive input coupled to the first node, and a negative input receiving the intermediate voltage, and configured to compare the ramp voltage and the intermediate voltage, to generate the frequency signal.

6. The power converter according to claim 3, wherein the phase detection circuit comprises:

a D-Flip-Flop having an input terminal receiving the detection signal, a clock terminal receiving the first switching signal, and an output terminal generating the detection signal.

7. The power converter according to claim 3, wherein the frequency divider circuit comprises:

a D-Flip-Flop having an input terminal, a clock terminal receiving the detection signal, an output terminal generating the clock signal, and an inverting output terminal.

8. The power converter according to claim 1, wherein the input terminal of the inductor buck circuit receives the intermediate voltage, and the inductor buck circuit comprises:

an input capacitor coupled between an input terminal of the inductor buck circuit and ground;

a high-side switch coupled between the input terminal of the inductor buck circuit and a first node;

a low-side switch coupled between the first node and ground;

an inductor coupled between the first node and the conversion output terminal; and an output capacitor coupled between the conversion output terminal and ground, wherein a turn-on period of the high-side switch and a turn-on period of the low-side switch do not overlap with each other.

* * * * *